(12) United States Patent
Pou et al.

(10) Patent No.: US 11,421,142 B2
(45) Date of Patent: Aug. 23, 2022

(54) COMPOSITION WHICH MAKES IT POSSIBLE TO DELAY THE FORMATION OF GAS HYDRATES

(71) Applicant: Arkema France, Colombes (FR)

(72) Inventors: Tong Eak Pou, Irigny (FR); Frédéric Moser, Pierre-Benite (FR)

(73) Assignee: Arkema France, Colombes (FR)

( * ) Notice: Subject to any disclaimer, the term of this patent is extended or adjusted under 35 U.S.C. 154(b) by 188 days.

(21) Appl. No.: 16/609,923

(22) PCT Filed: May 3, 2018

(86) PCT No.: PCT/FR2018/051105
§ 371 (c)(1),
(2) Date: Oct. 31, 2019

(87) PCT Pub. No.: WO2018/206881
PCT Pub. Date: Nov. 15, 2018

(65) Prior Publication Data
US 2020/0115616 A1   Apr. 16, 2020

(30) Foreign Application Priority Data

May 9, 2017 (FR) ...................... 1754040

(51) Int. Cl.
| | | |
|---|---|---|
| *C09K 8/52* | (2006.01) | |
| *C08L 39/04* | (2006.01) | |
| *C08L 39/06* | (2006.01) | |
| *C09K 8/035* | (2006.01) | |
| *C09K 8/60* | (2006.01) | |
| *C10L 3/10* | (2006.01) | |

(52) U.S. Cl.
CPC ............... *C09K 8/52* (2013.01); *C08L 39/04* (2013.01); *C08L 39/06* (2013.01); *C09K 8/035* (2013.01); *C09K 8/60* (2013.01); *C10L 3/107* (2013.01); *C09K 2208/22* (2013.01); *C10L 2250/04* (2013.01); *C10L 2290/141* (2013.01)

(58) Field of Classification Search
CPC ...... C09K 8/035; C09K 8/52; C09K 2208/22; C08L 39/04; C08L 39/06
See application file for complete search history.

(56) References Cited

U.S. PATENT DOCUMENTS

| | | |
|---|---|---|
| 5,741,758 A | 4/1998 | Pakulski |
| 6,025,302 A | 2/2000 | Pakulski |
| 6,180,699 B1 | 1/2001 | Bakeev et al. |
| 2002/0010101 A1* | 1/2002 | Pakulski ............... C09K 8/665 507/200 |

FOREIGN PATENT DOCUMENTS

| | | |
|---|---|---|
| EP | 1717288 A2 | 11/2006 |
| WO | 2004111161 A1 | 12/2004 |
| WO | 2010117660 A1 | 10/2010 |

OTHER PUBLICATIONS

Huntsman: The Jeffamine Polyetheramines, Huntsman, Jan. 1, 2007, retrieved from the internet on Feb. 8, 2018, https://www.huntsman.com/performance_products/Media%20Library/global/files/jeffamine_polyetheramines, 6 pages.
International Search Report and Written Opinion for International Application PCT/FR2018/051105, dated Jul. 9, 2018, 9 pages.

* cited by examiner

*Primary Examiner* — Aiqun Li
(74) *Attorney, Agent, or Firm* — RatnerPrestia

(57) ABSTRACT

Provided is a composition comprising at least one polymer, the repeat unit of which comprises at least one amide functional group, at least one polyetheramine with a weight-average molecular weight ($M_w$) of greater than 100 g.mol$^{-1}$ and exhibiting at least two secondary and/or tertiary amine functional groups, and optionally, but preferably, at least one organic solvent. Also provided is method of using of the composition for delaying, indeed even preventing, the formation of gas hydrates, in particular in a process for extracting oil and/or gas and/or condensates, and also to the process for delaying, indeed even preventing, the formation and/or the agglomeration of gas hydrates, employing a composition as defined above.

6 Claims, No Drawings

COMPOSITION WHICH MAKES IT POSSIBLE TO DELAY THE FORMATION OF GAS HYDRATES

CROSS-REFERENCE TO RELATED APPLICATIONS

This is the national phase of International Application No. PCT/FR2018/051105, filed 3 May 2018, which claims priority to French Application No. 1754040, filed 9 May 2017. The disclosure of each of these applications is incorporated herein by reference in its entirety for all purposes.

FIELD OF THE INVENTION

The present invention relates to the field of the extraction of hydrocarbons and more particularly to the field of the additives used to facilitate the extraction and the transportation of the said hydrocarbons towards the surface. The present invention relates very particularly to a process for inhibiting the formation of gas hydrates which are commonly known to disrupt the flow of hydrocarbons in the pipes for the extraction and transportation of the said hydrocarbons.

BACKGROUND OF THE INVENTION

This extraction of hydrocarbons, mainly oil, gas, condensates and others, is today carried out in very diverse environments and in particular in offshore sites, underwater sites or else in sites experiencing cold weather periods. These diverse environments can often result in significant cooling of the extracted fluids in contact with the cold walls of the transportation pipes.

Extracted fluids (or fluids produced or production fluids) is understood to mean the fluids comprising oil, gases, condensates, water and their mixtures. Oil is understood to mean, within the meaning of the present invention, crude oil, that is to say unrefined oil, originating from an oilfield.

Gases is understood to mean, within the meaning of the present invention, crude natural gases, that is to say untreated gases, extracted directly from a gasfield, such as, for example, hydrocarbons, such as methane, ethane, propane or butane, hydrogen sulfide, carbon dioxide and other compounds which are gaseous under the extraction conditions, and also their mixtures. The composition of the extracted natural gas varies considerably depending on the wells. Thus, the gas can comprise gaseous hydrocarbons, water and other gases.

Condensates is understood to mean, within the meaning of the present invention, hydrocarbons of intermediate density. Condensates generally comprise mixtures of hydrocarbons which are liquid under the extraction conditions.

It is known that these production fluids generally comprise an aqueous phase, in a greater or lesser amount. The origin of this aqueous phase may be endogenous and/or exogenous to the underground reservoir containing the hydrocarbons, the exogenous aqueous phase generally originating from injection of water, also known as "injection water".

The depletion of the sites discovered in the past is often nowadays leading the oil and gas industry to extract, in particular on new sites, from increasingly great depths, on offshore sites and with ever more extreme weather conditions.

On offshore sites in particular, the pipes for the transportation of the fluids produced are often positioned on the seabed, at ever greater depths, where the temperature of the seawater is often less than 15° C., more often less than 10° C., indeed even close to or equal to 4° C.

Similarly, it is common to find extraction sites located in geographical regions where the air and/or the surface water can be at relatively cold temperatures, typically below 15° C., indeed even below 10° C. In point of fact, at such temperatures, the fluids produced undergo significant cooling during their transportation. This cooling can be further magnified in the case of a shutdown or a slowdown in production, in which cases the contact time between the fluids produced and the cold walls of the pipe can increase, often considerably.

One of the disadvantages directly related to a more or less sudden lowering of the temperatures of the fluids produced is the formation of clathrates, also known as hydrate crystals, gas hydrates or more simply hydrates. The risk of formation of such hydrates in production fluids and in particular during oil, gas and condensate extraction is proportionately greater the lower the temperature of the production fluids and the higher the pressure of these fluids.

These clathrates are solid crystals (similar to those of water in the ice form) formed by water molecules, also called "hosts", around one or more gas molecules, also called "guests", such as methane, ethane, propane, butane, carbon dioxide or hydrogen sulfide.

The formation and the growth of these crystals are generally induced by a lowering of the temperature of the production fluids which exit hot from the geological reservoirs which contain them and which enter a cold region. These crystals can grow more or less rapidly and agglomerate and can cause pluggings or blockages of the production pipes, of the pipes for transportation of the hydrocarbons (oil, condensates, gas), of the valves and other elements liable to be completely or at least partially blocked.

These pluggings/blockages can lead to losses in production of oil, condensates and/or gas, resulting in not insignificant, indeed even very substantial, economic losses. This is because these pluggings and/or blockages will have the consequence of a decrease in the production output, indeed even a shutdown of the production unit. In the event of a blockage, the search for the region of the blockage and its removal will have the consequence of a loss of time and of profit for this unit. These pluggings and/or blockages can also lead to malfunctions with regard to safety elements (for example safety valves).

These problems of formation and/or agglomeration of hydrates can also be encountered in drilling muds or in completion fluids, during a drilling operation or a completion operation.

Various solutions have already been proposed or envisaged to reduce, delay or inhibit the formation and/or agglomeration of hydrates. Mention may in particular be made, among these, of a first solution which consists in dehydrating the production fluid, crude oil or gas, upstream of the region of the pipe where the temperature promotes the formation of the said hydrates. However, this solution is difficult, indeed even impossible, to implement under satisfactory economic conditions.

A second approach, which is also very expensive, consists in maintaining the temperature of the pipe at a temperature greater than the temperature of formation and/or agglomeration of the hydrates, at a given pressure.

A third approach, which is frequently used, consists in adding an additive denoted thermodynamic hydrate inhibitor (THI), generally an alcohol or alcohol derivative, for example methanol, or glycol, to the fluids produced containing the water/guest gas(es) mixture. It is nowadays commonly recognized that the addition of such an additive makes it possible to shift the equilibrium temperature for formation of the hydrates. In order to obtain an acceptable effectiveness, approximately 30% by weight of alcohol, with respect to the amount of water, is generally introduced. However, the toxicity of the alcohols or alcohol derivatives and the large amount of additive used are increasingly leading industrialists to adopt a fourth approach.

This fourth solution consists in adding an additive at low dosage, known as low dosage hydrate inhibitor (LDHI), to the fluids produced comprising the water/guest gas(es) mixture. This additive is also known as hydrate inhibitor and is introduced at a low dosage, generally of between 1% and 4% by weight, with respect to the weight of the water, it being understood that greater or smaller amounts are, of course, possible. Two types of hydrate-inhibiting are currently known: anti-agglomerant additives and kinetic hydrate inhibitors.

As indicated above, the formation of hydrates depends mainly on the temperature and the pressure, and also on the composition of the guest gas or gases. In order to be able to compare the performance of the additives, use is made of the notion of "sub-cooling" (SC). Sub-cooling is thus defined by the difference between the thermodynamic equilibrium temperature for formation of the hydrate crystals ($T_{eq}$), for a given pressure and a given composition of the hydrate-forming gases and of the aqueous phase, and the temperature of the fluids produced (or extraction temperature T), according to the following equation:

$$SC = T_{eq} - T.$$

When the sub-cooling is greater than or equal to 0° C., there is a risk of formation of gas hydrate and this risk increases as the sub-cooling increases.

Anti-agglomerant hydrate inhibitors are not inhibitors of the formation of hydrate crystals but have the property of dispersing them, which consequently prevents the said hydrate crystals from agglomerating together. The hydrate crystals, thus dispersed, can no longer plug the pipelines for transportation of the oil and gas production fluids, thus increasing the production, in particular the extraction of oil and gas.

Anti-agglomerant hydrate inhibitors retain their effectiveness even at low temperature. They make it possible in particular to prevent problems of blockage of pipes at temperatures generally of 15° C. below the minimum temperature at which the hydrate crystals form, for a given pressure.

Kinetic hydrate inhibitors, for their part, act on the germination and the growth of the hydrate crystals, delaying by several hours, indeed even by several days, the formation of the crystals. However, in contrast to anti-agglomerant hydrate inhibitors, kinetic hydrate inhibitors operate with difficulty at large sub-coolings. This is because, at temperatures of more than 10° C. below the minimum temperature at which the hydrate crystals form for a given pressure (SC≥10° C.), the effectiveness of the anti-agglomerant hydrate inhibitors is reduced.

In other words, at these sub-cooling levels, the time for appearance of the crystals is sufficiently short for them to appear, thus increasing the pressure loss in the pipes for the transportation of the oil and gas production fluids.

U.S. Pat. Nos. 5,741,758 and 6,180,699 show that kinetic hydrate inhibitors, such as polyoxyalkylenated diamines, in combination or not in combination with polymers comprising at least one monomer of vinylcaprolactam type, become less effective at sub-coolings of more than 10° C.

There consequently remains a real need to develop additives which make it possible to delay the formation of hydrates (kinetic hydrate inhibitors), which are even more effective and in particular which make it possible to operate at sub-coolings of greater than 10° C., better still of greater than 12° C., more advantageously of greater than 13° C., more preferably of greater than 15° C. In other words, there remains a real need for kinetic hydrate inhibitors which exhibit induction times (times for formation of the hydrates) which are as long as possible.

SUMMARY OF THE INVENTION

Another objective of the present invention consists in providing a kinetic hydrate inhibitor which is effective under the normal conditions of use, that is to say for a dosage of between 0.1% and 10% by weight, with respect to the total weight of the aqueous phase in a production fluid. Yet another objective is to provide a kinetic hydrate inhibitor which is not very toxic to the environment but also not very expensive and easy to produce.

It has now been discovered, surprisingly, that compositions comprising mixtures of specific polymers make it possible to satisfy the abovementioned objectives, and in particular to behave as kinetic hydrate inhibitors exhibiting relatively long induction times, and in particular longer induction times than those observed with the known kinetic hydrate inhibitors of the prior art, this being the case for relatively great sub-coolings. These polymer compositions are in addition shown to be environmentally friendly and easy to prepare with entirely reasonable production costs.

DETAILED DESCRIPTION OF THE INVENTION

Other objectives, characteristics, aspects and advantages of the invention will become even more clearly apparent on reading the description and examples which follow. In that which follows and unless otherwise indicated, the limits of a range of values are included in this range, in particular in the expressions "of between . . . and . . . " and "ranging from . . . to . . . ".

Thus, and according to a first aspect, the present invention relates to a composition comprising:
a) at least one polymer, the repeat unit of which comprises at least one amide functional group,
b) at least one polyetheramine with a weight-average molecular weight ($M_W$) of greater than 100 g.mol$^{-1}$, preferably of greater than 200 g.mol$^{-1}$, and exhibiting at least two secondary and/or tertiary amine functional groups, and
c) optionally, but preferably, at least one organic solvent.

The polymer, the repeat unit of which comprises at least one amide functional group, is a polymer, the amide functional groups of which are branched on the polymer chain. The nitrogen atoms of the amide functional groups can be substituted, and are preferably substituted, more preferably monosubstituted, more preferentially disubstituted. When the nitrogen atoms of the pendent amide functional groups are disubstituted, the two substituents can form a ring, so as to form a lactam with the amide link.

The substituents of the nitrogen atoms of the pendent amide functional groups can also comprise one or more nitrogen atom(s), preferably one nitrogen atom. This or these substituent nitrogen atom(s) of the nitrogen atoms of the pendent amide functional groups may also have reacted with one or more alkylating agent(s), so as to form an ammonium cation, it being possible for the anion to be chosen from all the anions known to a person skilled in the art and in particular from halides (for example chloride or bromide), sulfonates (for example methanesulfonate or para-toluenesulfonate), sulfates (for example methyl sulfate or ethyl sulfate), carbonates (for example methyl carbonate), and others.

In the composition according to the present invention, the polymer, the repeat unit of which comprises at least one amide functional group, is preferably a polymer obtained by polymerization of one or more monomers chosen from substituted or unsubstituted (meth)acrylamides, or vinyl monomers having lactam groups, in particular vinylpyrrolidones or vinylcaprolactams.

More particularly, among the abovementioned monomers, nonlimiting examples are vinylpyrrolidone (VP), vinylcaprolactam (VCap), acrylamide, methacrylamide, N-alkylacrylamide, N-alkylmethacrylamide, N,N-dialkylacrylamide, N,N-dialkylmethacrylamide, N,N-dialkylamino alkylacrylamide, N,N-dialkylaminoalkylmethacrylamide, and also their quaternary alkylammonium salts (halides, sulfonates, sulfates, carbonates and others).

The polymer, the repeat unit of which comprises at least one amide functional group, can, of course, be a homopolymer, a copolymer or else a terpolymer. Copolymer is understood to mean, in this invention, a polymer resulting from the polymerization of two different monomers. Similarly, terpolymer is understood to mean, in the present invention, a polymer resulting from the polymerization of three different monomers.

The copolymers and terpolymers which can be used in the context of the present invention can be block or graft, random, periodic or statistical copolymers, and respectively terpolymers, preferably of low molecular weight. Low molecular weight is understood to mean a weight of between 1000 and 5000 atomic mass units (amu) and preferably between 1500 and 4000 amu.

The monomers which can be used to form the copolymers and other terpolymers set out above can be of any type and are advantageously chosen from monomers which are functionalized and have vinyl unsaturation, such as, for example and without limitation, those chosen from acrylic acid, substituted alkyl acrylates, N,N-dialkylaminoalkyl acrylates and their corresponding quaternary alkyl chlorides, hydroxyalkyl acrylates, methacrylic acid, substituted alkyl methacrylates, N,N-dialkylaminoalkyl methacrylates and their corresponding quaternary alkyl chlorides, hydroxyalkyl methacrylates, and others, and also the mixtures of two or more of them in any proportion.

In the present description, the term "alkyl" represents, unless otherwise indicated, a saturated, linear or branched, hydrocarbon radical comprising from 1 to 10 carbon atoms, preferably from 1 to 6 carbon atoms, more preferably from 1 to 4 carbon atoms.

Yet other monomers can participate in the formation of the abovementioned copolymers and terpolymers and, among these, mention may be made, without, however, being limiting, of monomers containing at least one hydroxyl functional group and/or at least one functional group which can be converted into a hydroxyl functional group. Such monomers are in particular described in detail in the document WO2010117660. Mention may very particularly be made, among these, of vinyl acetate.

According to a preferred embodiment of the present invention, the monomers used for the preparation of the polymer, the repeat unit of which comprises at least one amide functional group (polymer a) of the composition of the present invention), are chosen from the monomers of vinylcaprolactam (VCap) type and of vinylpyrrolidone (VP) type.

Copolymers and terpolymers resulting from the copolymerization of at least one vinyl monomer having amide groups and/or cyclic amide groups (lactams) with a monomer containing a hydroxyl functional group and/or a functional group which can be converted into a hydroxyl functional group is understood to mean the copolymers resulting, for example, from the polymerization of the monomers of the type of vinylpyrrolidones (VP), vinylcaprolactams (VCap) and acrylamides with monomers containing a hydroxyl functional group and/or a functional group which can be converted into a hydroxyl functional group and in particular the monomers described thus in detail in the document WO2010117660.

Preferably, the copolymers of this type according to the invention are obtained by polymerization of vinylcaprolactams (VCap) and/or vinylpyrrolidones (VP) with vinyl acetate and more preferably by polymerization of vinylcaprolactams (VCap) with vinyl acetate. These polymers are known and are commercially available or are easily prepared from known procedures described in the scientific literature, on the internet or in patent applications, for example in the abovementioned document WO2010117660.

According to a preferred embodiment, when the monomer of vinylcaprolactam (VCap) type is polymerized in the presence of a monomer of vinylpyrrolidone (VP) type, the VCap/VP ratio by weight is of between 95/5 and 50/50, preferably between 75/25 and 50/50 and more preferably still between 60/40 and 50/50.

According to a very particularly preferred aspect, the polymer a) of the composition of the present invention is a polyvinylcaprolactam/polyvinylpyrrolidone (1/1) (in moles) copolymer, such as, for example, the product sold by BASF under the name Luvicap 55W®.

According to another preferred aspect of this invention, the copolymer a) of the composition according to the present invention is a VCap/VOH polymer obtained by polymerization of N-vinyl-2-caprolactam and vinyl acetate in an appropriate solvent known to a person skilled in the art (for example butyl glycol), followed by a hydrolysis of the polymer in an alkaline medium. The VCap/VOH ratio by weight in the final polymer is of between 50/50 and 95/5, preferably between 60/40 and 85/15 and more preferably still between 65/35 and 75/25. Mention may be made, among the copolymers of advantage for this invention, of the product sold by Ashland Inc. under the trade name Inhibex BIO 800.

The total amount of the copolymer or copolymers a) present in the composition of the invention is preferably of between 1% and 50% by weight, more preferably between 5% and 40% by weight and better still between 10% and 30% by weight, with respect to the total weight of the composition.

With regard to the polyetheramine b) of the composition of the present invention, it advantageously exhibits at least two secondary and/or tertiary amine functional groups. Preferably, this polyetheramine has two terminal amine functional groups, the two functional groups being secondary or tertiary amine functional groups; entirely preferably, the two terminal amine functional groups are both secondary amine functional groups.

According to a preferred aspect, the polyetheramine b) of the composition according to the invention exhibits a weight-average molecular weight ($M_w$) of greater than 100 g.mol$^{-1}$, more preferably of greater than 200 g.mol$^{-1}$.

This polyetheramine b) can, for example, be represented by the formula (I) below:

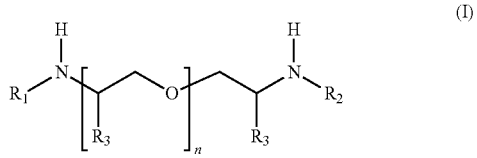

in which:
- $R_1$ and $R_2$, which are identical or different, represent a saturated or unsaturated and linear or branched hydrocarbon chain comprising from 1 to 24 carbon atoms, preferably from 1 to 12 carbon atoms, more preferably from 1 to 6 carbon atoms, and entirely preferably $R_1$ and $R_2$, which are identical or different, represent a saturated, linear or branched, hydrocarbon chain comprising from 3 to 6 carbon atoms, limits included,
- $R_3$ represents a hydrogen atom, a methyl radical or an ethyl radical, and
- n represents an integer of between 1 and 50, limits included.

When n is strictly greater than 1, it should be understood that the $R_3$ radicals can be identical or different, so that the polyetheramine of formula (I) can comprise alternating, block or random sequences of ethylene-oxy, propylene-oxy and/or butylene-oxy chains, preferably ethylene-oxy and/or propylene-oxy chains.

According to a preferred embodiment, the polyetheramine b) present in the composition according to the present invention corresponds to the formula (I) in which $R_1$, $R_2$ and $R_3$ are as defined above and n represents an integer of between 1 and 40, preferably between 1 and 30, more preferably between 1 and 20, entirely preferably between 1 and 10, limits included, and typically between 4 and 8, limits included.

Representative examples of such polyetheramines are, for example, those sold by Huntsman under the generic name Jeffamine® and described, for example, in the document available on the internet site of Huntsman on the page http://www.huntsman.com/portal/page/portal/performance_products/Media%20Library/global/files/jeffamine_polyetheramines.pdf.

Mention may in particular be made, among the di(secondary amines) which can be used entirely appropriately in the composition according to the present invention, of the polyetheramine sold by Huntsman under the name Jeffamine® SD401, or else Jeffamine® SD2001.

The total amount of the polyetheramine(s) present in the composition of the invention is generally of between 0.5% and 40% by weight, preferably between 1% and 30% by weight and more preferably between 5% and 20% by weight, with respect to the total weight of the composition.

The composition according to the present invention can optionally comprise one or more organic solvents. The organic solvents which can be used are advantageously chosen from alkyl alcohols comprising from 1 to 4 carbon atoms, glycol ethers and their mixtures. According to a preferred aspect, the organic solvent used is a glycol or a glycol mixture and very particularly preferably the organic solvent is butyl glycol.

The total amount of organic solvent(s) present in the composition of the invention is generally of between 30% and 90%, preferably between 50% and 90% and more preferably between 60% and 85%, by weight, with respect to the total weight of the composition.

The composition according to the present invention can be easily prepared, for example by mixing the various components, according to any means well known to a person skilled in the art, in any order, according to the compatibilities and the miscibilities of the components with one another. The compositions can thus be prepared by mixing by means of a stirrer, at ambient temperature and at atmospheric pressure.

It has been observed, entirely surprisingly, that the composition according to the invention makes it possible to delay by several hours, indeed even by several days, the formation and/or the agglomeration of hydrate crystals, in particular for sub-coolings of greater than 10° C. In addition, it has been observed that the composition of use in the context of the present invention often results in a longer induction time than the compositions or products currently available commercially.

A direct consequence is that the composition according to the present invention thus makes it possible to operate at lower temperatures than the current temperatures, while increasing the extraction efficiency and in particular the production output of oil and/or gas.

In addition, it has been discovered that this composition is effective at low concentrations, for example at dosages of between 0.1% and 10% by weight, preferably between 0.2% and 7% by weight, more preferably between 0.2% and 5% by weight and better still between 1% et 4% by weight, with respect to the total weight of the aqueous phase in a production fluid, and very particularly between 0.2% and 4%, typically between 0.2% and 3%, in particular between 1% and 3%, by weight. The composition according to the present invention is also not very expensive, is easy to produce and is not very toxic.

Thus, and according to another aspect, the present invention relates to a process for delaying, indeed even preventing, the formation and/or the agglomeration of gas hydrates, comprising a stage of addition of a composition as defined above to a mixture having a composition liable to form hydrates, as described above in this text, and in particular to a production fluid comprising an aqueous phase and one or more gases.

More specifically, the total content of the aqueous phase present in the production fluid is generally of between 10% and 90% by weight, with respect to the total weight of the production fluid, that is to say with respect to the total weight of the fluids (aqueous phase and hydrocarbons). However, the treatment of fluid having a very high content of aqueous phase or containing less than 10% of aqueous phase, indeed even less than 1% of aqueous phase, would not depart from the field of the invention.

The total content of aqueous phase defined above corresponds to the total proportion of aqueous phase initially present in the production fluid, that is to say in the initial mixture (aqueous phase and the other crude extraction liquids, such as hydrocarbons, condensates, and the like).

The aqueous phase of the production fluid additionally comprises one or more dissolved gases liable to form, with water, gas hydrates at a given temperature and at a given pressure. Some of the gases present in the aqueous phase of the production fluid are "guest" gases, as defined above, and generally comprise methane, ethane, propane, butane, carbon dioxide, hydrogen sulfide and their mixtures.

The composition according to the invention is added in an amount between 0.1% and 10% by weight, preferably between 0.2% and 7% by weight, more preferably between 0.2% and 5% by weight and better still between 1% et 4% by weight, with respect to the total weight of the aqueous phase in a production fluid, and very particularly between 0.2% and 4%, typically between 0.2% and 3%, in particular between 1% and 3%, by weight.

The composition can be introduced into the production fluid continuously, discontinuously, regularly or irregularly, or temporarily, in one or more portions. The composition is generally introduced upstream of the region at risk of the presence of hydrates, whether at the surface, at the well head or at the well bottom.

According to another embodiment of the process of the invention, the fluid treated with the composition according to the invention is a drilling mud or a completion fluid. In this embodiment, the composition is introduced into the drilling mud or into the completion fluid, before or during the injection of the drilling mud or of the completion fluid.

Finally, another subject-matter of the present invention is the use of a composition as defined above for delaying, indeed even preventing, the formation and/or the agglomeration of hydrates, preferably in a process for extracting oil and/or gas and/or condensates.

A better understanding of the invention will be obtained in the light of the following examples, which are given for illustrative purposes only and which are not intended to limit the scope of the invention, defined by the appended claims.

EXAMPLES

Example 1

The kinetic effectiveness of different hydrate-inhibiting compositions was tested on a mixture comprising:
- a gas phase, consisting of 98 mol % of methane and 2 mol % of propane; and
- an aqueous phase comprising a 1 g.l$^{-1}$ NaCl solution.

The tests were carried out at a pressure of 135 bar (13.5 MPa), a pressure value which is characteristic of the extraction conditions where a risk of hydrate formation exists. The equilibrium temperature of this mixture at 135 bar (13.5 MPa) is approximately 19.5° C. In other words, at 135 bar (13.5 MPa), the gas hydrates form when the temperature becomes less than or equal to 19.5° C.

The tests are carried out in a mechanically stirred cell temperature-controlled by a jacket. The cell is cylindrical in shape with an internal volume of approximately 292.6 cm$^3$ (149 mm in height for 50 mm in diameter). It is made of steel resistant to 200 bar (20 MPa) and is protected by a valve. The working pressure is provided by an AG-30 gas booster from Haskel. The cell comprises instruments in order to be able to continuously monitor the internal pressure, the stirring torque and the temperature.

In order to carry out the evaluations of the different products, 250 cm$^3$ of aqueous phase containing the additive to the evaluated, or without additive (reference), are first introduced into the cell, under vacuum by suction. After equilibrating the temperature at 19.5° C., the gas mixture is charged, with stirring, to the cell until a stable pressure of 135 bar (13.5 MPa) is obtained.

The assembly is subsequently heated to and maintained at 30° C. for 24 hours in order to erase the thermal history of the mixture and is then brought down, at the rate of 0.2° C./min, to the temperature corresponding to the targeted sub-cooling (in this instance 9.5° C. and 4.5° C. for respective sub-coolings of 10° C. and 15° C.).

The kinetic effectiveness of the hydrate-inhibiting compositions is measured at different sub-coolings (10° C. and 15° C.) but also at different dosages. The dosage corresponds in this instance to the amount (weight) of hydrate-inhibiting composition introduced into the aqueous phase, with respect to the weight of the water.

The kinetic performance of the hydrate-inhibiting compositions is determined by the measurement of the delay time to the formation of the hydrate crystals. This time, also known as induction time, is expressed in hours or in days. In other words, the longer the induction time, the more effective the hydrate inhibitor.

In this instance, this time is measured from the moment when the temperature in the cell reaches the target temperature of the test corresponding to the sub-cooling studied (9.5° C. and 4.5° C. for respective sub-coolings of 10° C. and 15° C.) and the pressure in the cell has stabilized. The final point for measuring the induction time corresponds to the start of formation of the hydrates. It is located on the curve of pressure as a function of the time by the point where the pressure begins to fall in the cell (fall in pressure corresponding to the consumption of gas in order to form solid hydrates) and confirmed by an increase in the torque of the stirrer (viscosification of the medium, which becomes loaded with solid) and possibly a very slight exothermic peak on the temperature curve.

The composition A, according to the invention, and the comparative compositions B, C, D and E (in accordance with the teaching of the patent U.S. Pat. No. 6,180,699) were prepared by mixing the different components, the amounts of which are expressed in Table 1 below.

Unless otherwise indicated, all the amounts are shown as percentage by weight, with respect to the total weight of the composition.

TABLE 1

|  | Composition A (invention) | Composition B (comparative) | Composition C (comparative) | Composition D (comparative) | Composition E (comparative) |
| --- | --- | --- | --- | --- | --- |
| Luvicap 55W[a] | 20% | 30% | — | 20% | — |
| Luvicap EG[b] | — | — | — | — | 20% |
| Jeffamine D 230[c] | — | — | — | — | 10% |
| Jeffamine D 400[c] | — | — | — | 10% | — |
| Jeffamine SD 401[d] | 10% | — | 30% | — | — |
| 2-Butoxyethanol | 70% | 70% | 70% | 70% | 70% |

[a] vinylpyrrolidone (VP)/vinylcaprolactam (VCap) 1:1 copolymer, sold by BASF
[b] polyvinylcaprolactam (VCap) homopolymer, sold by BASF
[c] polyalkoxydiamine (di(primary amine)), sold by Huntsman
[d] polyalkoxydiamine (di(secondary amine)), sold by Huntsman The kinetic effectiveness of the hydrate-inhibiting compositions, for a sub-cooling of 10° C., is evaluated for respective dosages of 1% and 3% by weight for each of the compositions A (invention), B, C, D and E (comparative). Each of the test compositions is introduced into the aqueous phase and the experiment is carried out as described above.

The kinetic performance of these compositions, characterized by the induction time, was measured twice, and the mean of these measurements is expressed in Table 2 below.

TABLE 2

Results for a sub-cooling of 10° C.

| | Composition A (invention) | Composition B (comparative) | Composition C (comparative) | Composition D (comparative) | Composition E (comparative) |
|---|---|---|---|---|---|
| Induction time Dose = 1% | 105 hours | 86 hours | 10 hours | 60 hours | 50 hours |
| Induction time Dose = 3% | 120 hours | 90 hours | 15 hours | 70 hours | 60 hours |

The above results show that, for a sub-cooling of 10° C., the compositions of the present invention are more effective than the comparative compositions. This is because, in the composition according to the present invention, where in the vinylcaprolactam/vinylpyrrolidone copolymer is in a mixture with a di(secondary amine) (composition A), 105 hours (for a dosage of 1% by weight) and 120 hours (for a dosage of 3% by weight) are needed to see the appearance of gas hydrates.

By way of comparison, the composition C, which comprises only the solvent and the same di(secondary amine), delays the appearance of the hydrates by only 10 hours, for a dosage of 1% by weight, and by only 15 hours, for a dosage of 3% by weight. The composition B, which comprises only the solvent and the same copolymer, makes it possible to delay their formation by only 86 hours (for a dosage of 1% by weight) and by only 90 hours (for a dosage of 3% by weight).

These results also show that the composition according to the present invention (composition A) is much more effective than the compositions known from the prior art, for example the composition E according to the patent U.S. Pat. No. 6,180,699, which delays the formation of hydrate by only 50 hours (for a dosage of 1% by weight) and by only 60 hours (for a dosage of 3% by weight).

The same tests are subsequently carried out for a greater sub-cooling, now of 15° C. Each of the compositions A (invention) and B, C, D and E (comparative) is evaluated, according to the protocol described above, at the doses of 1% and 3% by weight of each of the compositions A (invention) and B, C, D and E (comparative).

The kinetic performance of these compositions was measured twice, and the mean of these measurements is expressed in Table 3 below.

These results lead to very similar conclusions. At a dosage of 1% by weight, the comparative composition D delays the formation of gas hydrates by only 8 hours, whereas the composition according to the invention (composition A) delays this formation by 26 hours.

Furthermore, the vinylcaprolactam/vinylpyrrolidone copolymer alone (composition B), and also the di(secondary amine) alone (composition C), are poor kinetic hydrate inhibitors at high sub-cooling, since it is found that they delay only very slightly or do not delay at all the formation of the hydrates under these temperature conditions.

Finally, with a dosage of 3% by weight of composition A, the formation of gas hydrates is delayed by 90 hours, for a sub-cooling of 15° C.

An advantage is thus clearly established with respect to the prior art, in that the composition according to the present invention results in a longer induction time for greater sub-coolings (15° C.) than that observed with the compositions of the prior art. It is thus possible to work at lower temperatures than the current temperatures while increasing the production output of oil and/or gas.

Example 2

A study of the kinetic effectiveness of different hydrate-inhibiting compositions is carried out, according to the same protocol as that defined in Example 1.

The kinetic effectiveness of the hydrate-inhibiting compositions is measured at different sub-coolings (10° C. and 11° C.). The dosage corresponds in this instance to the amount (weight) of hydrate-inhibiting composition introduced into the aqueous phase, with respect to the weight of the water.

As indicated in Example 1, the induction time is measured from the the moment when the temperature in the cell reaches the temperature of 9.5° C. for a sub-cooling of 10° C. and the pressure in the cell has stabilized. In the absence of formation of hydrate after a certain time, the test is continued by the lowering of the temperature in the cell in order to reach 8.5° C. for a sub-cooling of 11° C. Once the pressure in the cell has stabilized at 8.5° C., the induction time at 8.5° C. is measured. The final point for measuring the induction time corresponds to the start of formation of the

TABLE 3

Results for a sub-cooling of 15° C.

| | Composition A (invention) | Composition B (comparative) | Composition C (comparative) | Composition D (comparative) | Composition E (comparative) |
|---|---|---|---|---|---|
| Induction time Dose = 1% | 26 hours | 1 hour | <1 hour | 4 hours | 2 hours |
| Induction time Dose = 3% | 90 hours | 3 hours | <1 hour | 12 hours | 4 hours | hydrates. It is located on the curve of pressure as a function of the time by the point where the pressure begins to fall in the cell (fall in pressure corresponding to the consumption of gas in order to form solid hydrates) and confirmed by an increase in the torque of the stirrer (viscosification of the medium, which becomes loaded with solid) and possibly a very slight exothermic peak on the temperature curve.

The composition F according to the invention was prepared by mixing the different components, the amounts of which are expressed in Table 4 below.

Unless otherwise indicated, all the amounts are shown as percentage by weight, with respect to the total weight of the composition.

TABLE 4

|  | Composition F (invention) |
| --- | --- |
| Luvicap 55W[a] | 20% |
| Jeffamine SD 2001[b] | 10% |
| 2-Butoxyethanol | 70% |

[a]vinylpyrrolidone (VP)/vinylcaprolactam (VCap) 1:1 copolymer, sold by BASF
[b]polyalkoxydiamine (di(secondary amine)), sold by Huntsman The kinetic effectiveness of the composition F for a sub-cooling of 10° C. and of 11° C. is evaluated for a dosage of 1% by weight. The test composition is introduced into the aqueous phase and the experiment is carried out as described above.

The kinetic performance of these compositions, characterized by the induction time, was measured twice, and the mean of these measurements is expressed in Table 5 below.

TABLE 5

| Results for a sub-cooling of 10° C. | | |
| --- | --- | --- |
|  | Composition F (invention) | Composition B (comparative) |
| Induction time Dose = 1% | More than 106 hours | 86 hours |

The results above show that, for a sub-cooling of 10° C., the composition of the present invention is more effective than the comparative composition B, which is eliminated for the sub-cooling of 10° C. This is because, in the composition according to the present invention, where the vinylcaprolactam/vinylpyrrolidone copolymer is in a mixture with a di(secondary amine) (composition F), it was not possible in 106 hours to see the appearance of gas hydrates (for a dosage of 1% by weight).

The test with the composition F was continued for a greater sub-cooling, now of 11° C., according to the protocol described above, at the dose of 1% by weight.

The kinetic performance of this composition was measured twice, and the mean of these measurements is expressed in Table 6 below.

TABLE 6

| Result for a sub-cooling of 11° C. | |
| --- | --- |
|  | Composition F (invention) |
| Induction time Dose = 1% | 25 hours |

An advantage is thus clearly established with respect to the prior art, in that the composition according to the present invention makes it possible to work at temperatures which are lower than the current temperatures and which correspond to sub-cooling values encountered during production.

Example 3

The objective of the test of thermal stability with injection is to determine if the hydrate-inhibiting composition can be injected into the line transporting the water/gas/condensate fluids, when they are still hot, without causing deposition or blockage. The test comprises two parts. The hydrate-inhibiting composition F is stored in a closed flask in a climatically controlled chamber at 90° C. for 24 h without the slightest change in appearance being noticed. An aqueous solution comprising 30 g of sodium chloride (NaCl) per litre is prepared and heated to 90° C. on a heating plate. The composition F is injected into the aqueous solution in a few seconds using a syringe, so as to have a concentration of 1% by weight. No appearance of any deposit, gel or suspension over 1 hour is recorded.

Example 4

The objective of the emulsion test is to determine if the hydrate-inhibiting composition can be injected into the line transporting the water/gas/condensate fluids, without causing, in the downstream plants, problems related to the presence of a stable emulsion. An aqueous solution comprising 30 g of NaCl per litre, and also white spirit in equal proportion, are poured into a flask at ambient temperature. This operation is repeated in two other flasks. The mixtures are supplemented by the addition of 2% by weight of formulation A or F respectively for the second and third flasks. The three flasks are vigorously stirred until a visually homogeneous emulsion is obtained.

The flasks are observed after 19 seconds, 43 seconds and 1 minute and 2 seconds. In the flask not containing hydrate inhibitor, the emulsion has virtually completely disappeared from 19 seconds. In the flask containing the composition A and the flask containing the composition F, the emulsion is still stable at 43 seconds. At 1 minute and 2 seconds, no emulsion is stable any longer; separation of the two phases is observed. These periods of time during which the emulsions are stable are perfectly acceptable for this use.

Example 5

The objective of the dehydration test is to determine if the hydrate-inhibiting composition can be separated from the water which contains it, by evaporation of the water. This is because it may be useful to separate the hydrate-inhibiting additive, once the fluids have exited from the region thermally favourable to the hydrates, before discarding the water produced during the extraction from the field, so as to limit the impact on the environment or on the rock receiving the water produced.

200 ml of an aqueous solution comprising 0.5% by weight of formulation F and 1 g.l$^{-1}$ of NaCl are prepared. The solution is placed in a narrow and wide glass container, so as to have a large contact surface area between the solution and the glass. The open container is placed in an oven at 130° C. until only 2 ml of liquid remains. Deposition on the walls is not observed, apart from a few marks containing NaCl crystals, resulting from the evaporation of a few drops of water projected onto the walls during the filling. Likewise, the aqueous solution remains clear. Thus, the hydrate-inhibiting composition F can be separated from the water without risk of deposition in the plants.

The invention claimed is:

1. A composition comprising:
   a) 5 to 40 wt %, with respect to the total weight of the composition, of at least one polymer, the repeat unit of which comprises at least one amide functional group, where the polymer is obtained by polymerization of monomers of vinylcaprolactam (VCap) and of vinylpyrrolidone (VP), where the ratio of VCap to VP is from 95:5 to 50:50 by weight,
   b) 5 to 30 wt %, with respect to the total weight of the composition, of at least one polyetheramine with a weight-average molecular weight ($M_w$) of greater than 100 g.mol$^{-1}$, and exhibiting at least two secondary and/or tertiary amine functional groups, and
   c) optionally, at least one organic solvent,
   wherein the polyetheramine b) is represented by the formula (I) below:

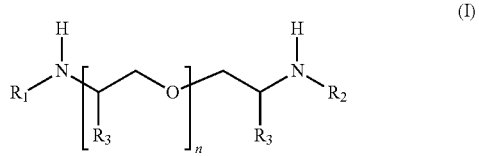

(I)

wherein: $R_1$ and $R_2$, which are identical or different, represent a saturated or unsaturated and linear or branched hydrocarbon chain comprising from 1 to 6 carbon atoms, limits included,
$R_3$ represents a hydrogen atom, a methyl radical or an ethyl radical, and
n represents an integer of between 1 and 20, limits included.

2. The composition according to claim 1, wherein the at least one organic solvent is selected from alkyl alcohols comprising from 1 to 4 carbon atoms, glycol ethers and their mixtures.

3. A process for delaying or preventing formation and/or agglomeration of gas hydrates, comprising a stage of adding the composition according to claim 1 to a mixture liable to form hydrates.

4. The process according to claim 3, wherein the composition is added in an amount between 0.1% and 10% by weight, with respect to the total weight of an aqueous phase in a production fluid present in the mixture.

5. The process according to claim 4, wherein the composition is introduced into the production fluid continuously, discontinuously, regularly or irregularly, or temporarily, in one or more portions.

6. The process according to claim 3, wherein a fluid present in the mixture treated with the composition is a drilling mud or a completion fluid.

* * * * *